United States Patent
Vierimaa

(10) Patent No.: US 11,809,848 B2
(45) Date of Patent: Nov. 7, 2023

(54) METHOD AND SYSTEM FOR PROTOCOL PROCESSING

(71) Applicant: Siemens Industry Software Inc., Plano, TX (US)

(72) Inventor: Kari Vierimaa, Kempele (FI)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 0 days.

(21) Appl. No.: 18/021,959

(22) PCT Filed: Aug. 28, 2020

(86) PCT No.: PCT/US2020/048415
§ 371 (c)(1),
(2) Date: Feb. 17, 2023

(87) PCT Pub. No.: WO2022/046075
PCT Pub. Date: Mar. 3, 2022

(65) Prior Publication Data
US 2023/0273778 A1    Aug. 31, 2023

(51) Int. Cl.
*G06F 8/41* (2018.01)

(52) U.S. Cl.
CPC ...................... *G06F 8/41* (2013.01)

(58) Field of Classification Search
CPC ......................................................... G06F 8/41
USPC ......................................................... 717/140
See application file for complete search history.

(56) References Cited

U.S. PATENT DOCUMENTS

| 7,676,198 | B2 * | 3/2010 | Mahany | H04B 1/692 370/335 |
| 11,636,046 | B1 * | 4/2023 | Tran | H04L 9/0631 380/43 |
| 2019/0020581 | A1 * | 1/2019 | Chritz | H04L 45/124 |
| 2019/0215729 | A1 * | 7/2019 | Oyman | H04L 65/1016 |
| 2019/0341091 | A1 * | 11/2019 | Sity | G06F 15/8038 |
| 2020/0089480 | A1 | 3/2020 | Chen et al. | |

FOREIGN PATENT DOCUMENTS

| EP | 3637826 A1 | 4/2020 |
| WO | 2020077086 A1 | 4/2020 |

OTHER PUBLICATIONS

Title: LegUp: high-level synthesis for FPGA-based processor/accelerator systems, author: A Canis, A Canis, et al., published on 2011.*

(Continued)

*Primary Examiner* — Chameli Das
(74) *Attorney, Agent, or Firm* — Lempia Summerfield Katz LLC

(57) ABSTRACT

A method of protocol processing including a main program code that has one or more code segments and instructions for processing different protocol elements of a data packet stream of a transport protocol is disclosed herein. The method includes assigning a latency requirement and/or bandwidth requirement to one or more of the code segments of the main program code; and compiling each of the code segments according to the assigned latency and/or bandwidth requirement into a respective target code for executing each of the target codes by different processors.

17 Claims, 11 Drawing Sheets

(56) References Cited

OTHER PUBLICATIONS

Title: Latency-Tolerant software distributed shared memory, author: J Nelson, et al., published on 2015.*
ECPRI presentation "Common Public Radio Interface ", 2018 Ericsson AB, Huawei Technologies Co. Ltd, NEC Corporation and Nokia. a href="http://www.cpri.info/downloads/eCPRI_Presentation_for_CPRI_Server_2018_01_03. pdf," target="_blank"http://www.cpri.info/downloads/eCPRI_Presentation_for_CPRI_Server_2018_01_03.pdf;/a pp. 1-46.
PCT International Search Report and Written Opinion of International Searching Authority dated Apr. 13, 2021 corresponding to PCT International Application No. PCT/US2020/048415.
Siddiqui Shuaib: "Converged Heterogeneous Advanced 5G Cloud-RAN Architecture for Intelligent and Secure Media Access—Delivrable 3.2—Intial 5G multi-provider v-security realization: Orchestration and Management"; Deliverables of the Horizont 2020 Framework Programme of the European Union; H2020-ICT-2014-1; Advanced 5G Network Infrastructure for the Future Internet; Jun. 30, 2016; pp. 1-145.

* cited by examiner

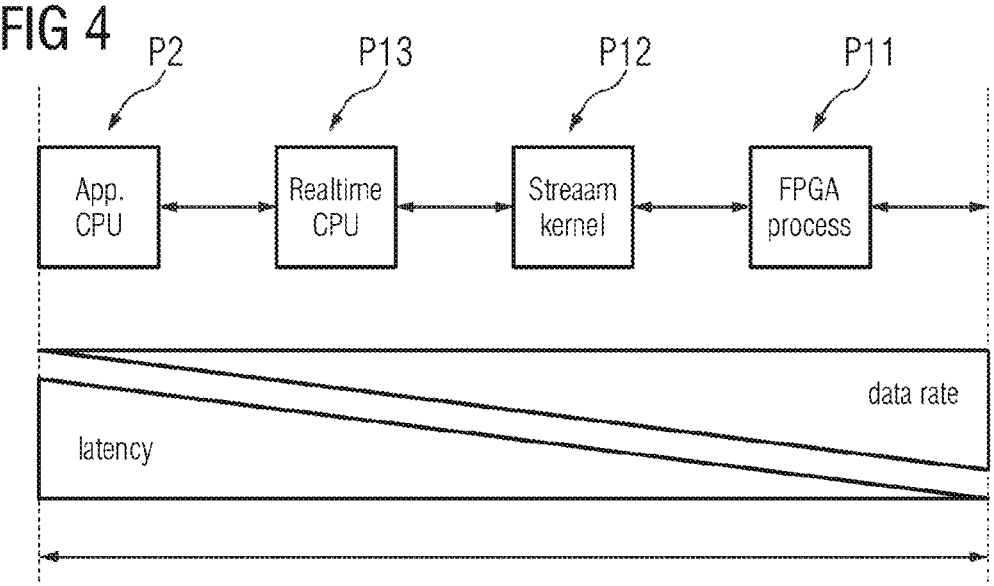
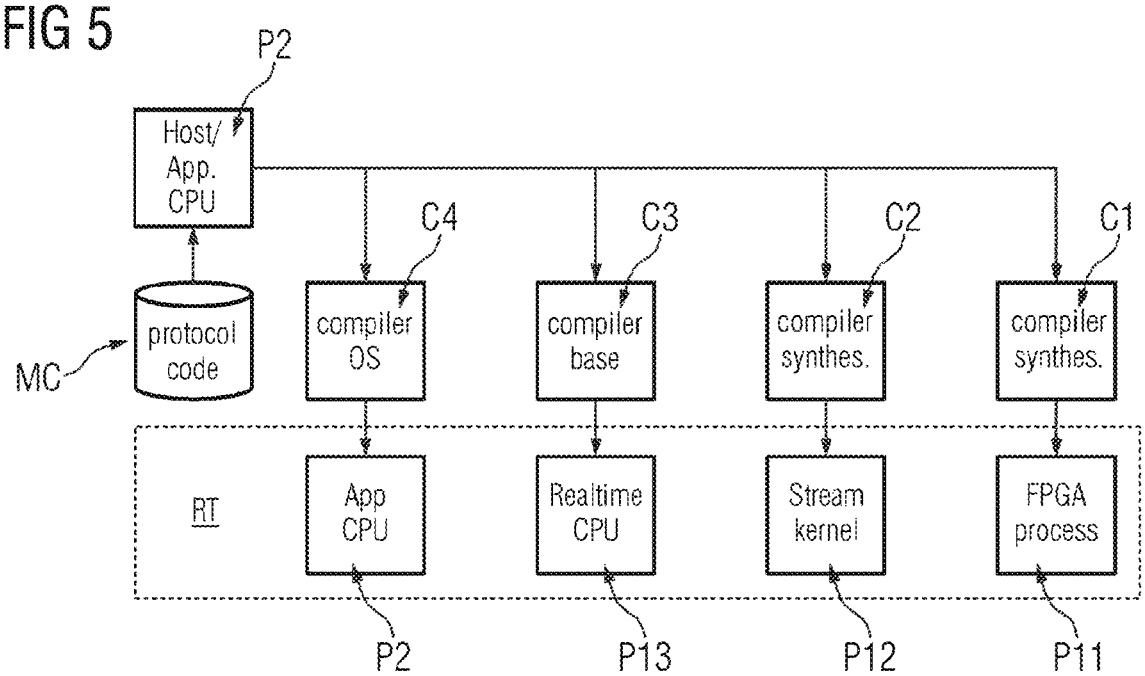

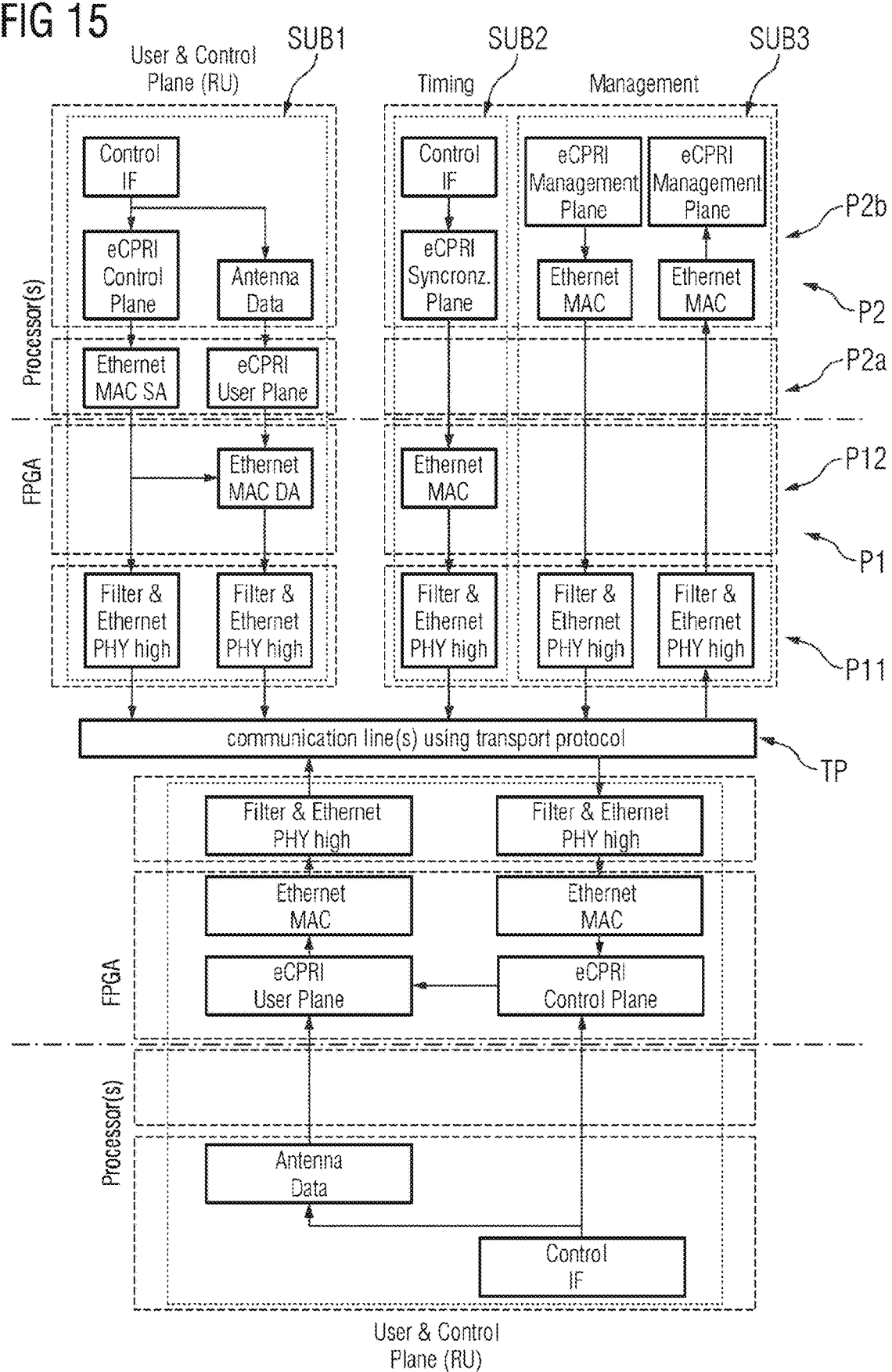

METHOD AND SYSTEM FOR PROTOCOL PROCESSING

The present patent document is a § 371 nationalization of PCT Application Serial No. PCT/US2020/048415, filed Aug. 28, 2020, designating the United States, which is hereby incorporated by reference.

TECHNICAL FIELD

The disclosure relates to program code compilation, network communication, and an improved processor architecture for data packet stream processing.

BACKGROUND

In particular, in modern telecommunication systems, many communication interfaces and communication protocols are present. New technologies are being designed and old systems are further developed, so there are many product generations on the market. Communication protocols are being developed as well and, as a consequence, several protocol versions are applied concurrently. For example, Ethernet has been proposed for the 5G fronthaul to transport the Common Public Radio Interface (CPRI) traffic between the radio equipment (RE) and the radio equipment control (REC), cf. http://www.cpri.info/downloads/eCPRI Presentation for CPRI_Server_2018_01_03.pdf.

The advantages of adopting an Ethernet transport are threefold: 1) the low cost of equipment; 2) the use of a shared infrastructure with statistical multiplexing; and 3) the ease of operations, administration, and maintenance (OAM). However, a number of challenges exists: ultra-high-bit-rate requirements from the transport of increased bandwidth radio streams for multiple antennas in future mobile networks, and low latency and jitter to meet delay requirements and the demands of joint processing. eCPRI does not constrain the use of specific network- and data link-layer protocols to form the network. Hence, any type of (transport) network can be used for eCPRI, provided the eCPRI requirements are fulfilled.

In the case of radio equipment test devices, such as described in European patent application publication EP 3637826 A1, the test device may support as much as possible of the required protocol(s), for example, eCPRI. However, the possible configurations are extensive. Furthermore, the implementations of different manufacturers may differ and thus cause further protocol variations.

Extensive parameterization options and the large resulting parameter space and the possible FPGA and/or ASIC implementations mean that product development takes a long time to market. Also, in the case of FPGA circuits, it may be difficult to implement new features when the FPGA utilization rate is high, e.g., there is no downtime of the FPGA usage. On top of that, it takes time to test and verify a specific FPGA and/or ASIC implementation.

Currently, Mentor Graphics' test device, X-STEP, utilizes specifically parameterized software and FPGA circuit solutions for protocol processing. Therein, the software runs on an application processor or host processor and the required runtime processing is performed by the FPGA circuit, e.g., in hardware. The problem with this architecture has become the runtime data processing and reactive two-way transmission between the software on the application processor and the data processing on the FPGA circuit. The increased FPGA requirements can be reduced by limiting the features that the product—in which the FPGA is used—supports. However, this also limits the number of solutions that may be offered to the customer.

A solution may be to use bigger and bigger FPGA/ASIC chips. However, the problem arises that choosing a larger chip is no longer sensible. A larger chip also increases the cost of product development, product, and testing. Furthermore, a larger chip also causes new problems with respect to power and heat issues.

A processor-driven software-based solution is faster to develop than a hardware-based FPGA/ASIC functionality. However, pure software solutions have traditionally been slower and less accurate than hardware-based circuit solutions. FIG. 1 shows a block diagram of a commonly used method to utilize a dedicated hardware implementation for protocol processing and a software application processing the payload. In this method, all of the payload is transmitted via a memory which serves as a single transmission interface between the hardware- and software-based processing. Unfortunately, accurate timing information related to the payload is lost with this method.

An alternative solution would be to perform all processing directly in hardware, but this increases the requirements for the FPGA/ASIC circuits, as discussed. In that case all of the processing related to the transmission protocol is done by an FPGA. Management messages are driven to the application processor as the earlier implementation example. For example, the framing and de-framing of payload, and the corresponding real-time data control messages (when enabled), may be handled in hardware. The remaining user data services can be handled by a software.

SUMMARY

Accordingly, it is an object to improve protocol processing, in particular processing of data packets of a data packet stream. Furthermore, it is an object to improve utilization of the one or more processors used for protocol processing. It is also an object to improve data transmission, in particular of radio data, through a, for example packet-based, transport network connecting one or more radio stations, e.g. one or more Remote Radio Units (RRUs) to the centralized Baseband Unit (BBU) and/or to a device under test.

The scope of the present disclosure is defined solely by the appended claims and is not affected to any degree by the statements within this summary. The present embodiments may obviate one or more of the drawbacks or limitations in the related art.

The object is achieved by the following aspects.

According to a first aspect, a method of protocol processing including a main program code is proposed. The main program code includes instructions for processing different protocol elements of a data packet stream of a transport protocol. The main program code further includes one or more code segments. The method includes assigning a latency requirement and/or bandwidth requirement to one or more of the code segments of the main program code. The method further includes compiling each of the code segments according to the assigned latency and/or bandwidth requirement into a respective target code for executing each of the target codes by different processors.

According to a second aspect, an apparatus is proposed. The apparatus being operative to perform the method acts of the first aspect.

According to a third aspect, a main program code is proposed. The main program code includes instructions for processing different protocol elements of a data packet stream of a transport protocol.

BRIEF DESCRIPTION OF THE DRAWINGS

FIG. 4 illustrates an example of latency and data rate requirements.

FIG. 5 depicts a block diagram of an example of a protocol source code that is divided into code segments and compilation of the code segments into target codes for execution of the target codes by different processors.

FIG. 15 depicts an embodiment of the eCPRI protocol processing by different processors.

DETAILED DESCRIPTION

Figure 1:
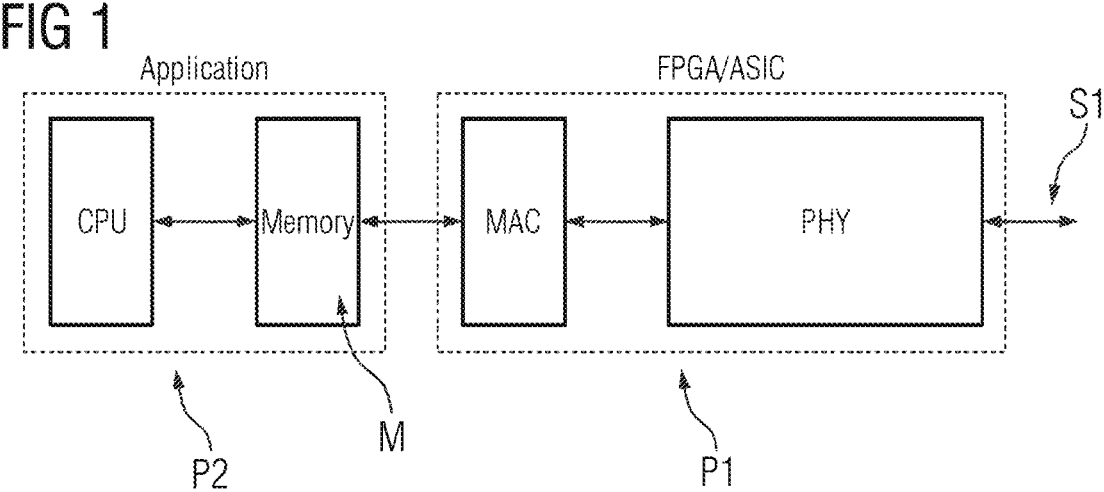
FIG. 1 depicts a block diagram of an example of a method for protocol processing.

FIG. 1 shows a block diagram of a method to utilize a dedicated hardware implementation, e.g., on the first the processor P1, in this case an FPGA or ASIC, for protocol processing and a software application, on a second processor P2, in this case a CPU, processing the payload. In this method, all of the payload is transmitted via a memory M which serves as a single transmission interface between the hardware- and software-based processing. As already mentioned, accurate timing information related to the payload is lost with this method. The first processor P1 in FIG. 1 receives a data packet stream S1 using a transport protocol. The transport protocol may be an ISO/OSI layer 2, (e.g., data link layer), and/or layer 3, (e.g., network layer), protocol. The transport protocol may thus be Ethernet or eCPRI or may include both, Ethernet and encapsulated eCPRI (Radio over Ethernet, RoE). Radio over Ethernet, IEEE 1904.3, is an open & free standardization effort to specify a transport protocol and an encapsulation format for transporting time-sensitive wireless (cellular) radio related application streams between two endpoints over Ethernet-based transport networks. For example, in the case of radio equipment, software applications such as throughput testing of the network, where a frame loss analysis and/or a delay analysis is performed, need to be performed.

As can be seen in FIG. 1, the first processor P1, in this case an FPGA or ASIC, may process all the protocol elements, e.g., in case of Ethernet protocol, the Ethernet frame elements such as preamble, MAC destination, MAC source, and/or the frame check sequence. A physical layer transceiver circuitry (PHY), may also be implemented in the first processor P1, and is required to connect to the physical medium.

A PHY connects a link layer device (e.g., called MAC as an acronym for medium access control) to a physical medium such as an optical fiber or copper cable. The PHY may not handle MAC addressing.

The second processor P2, in this case a CPU, may take care of the payload processing. In the embodiment of FIG. 1, the protocol processing is thus solely performed by the first processor.

The ever-increasing data traffic demands put very strict timing requirements on both accuracy (stability of time synchronization) and network latency. Allowing the network to support very stringent demands places sub-µs-level requirements on the transport network. Latency across the network is almost as critical as timing and has become far more important in 5G networks because devices are placing strict latency requirements on the network. Also, the bandwidth requirements e.g., for CPRI, are high and the link rates are currently limited without the possibility to scale up. Bandwidth is not the only restrictive aspect, in fact very strict latency constraints that does not permit transporting data for long distance may be in place. The bandwidth between application processor, P2, and FPGA, P1, may be low. This may be a drawback, (e.g., in certain radio equipment test scenarios), where test models of IQ data for sending IQ data to a remote radio head and subsequently receive a response at a high data rate is required.

Figure 2:
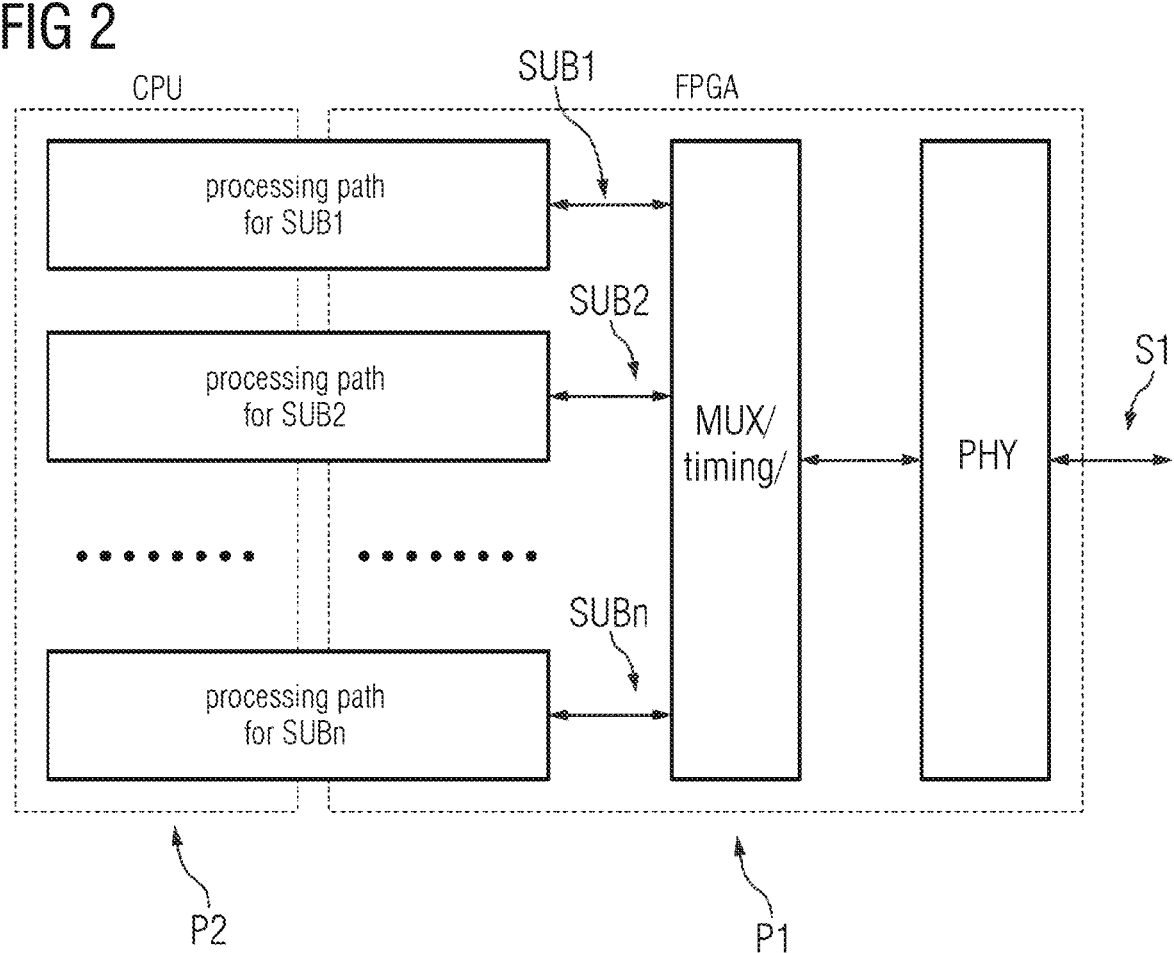
FIG. 2 depicts a block diagram of an example of an improved method for protocol processing.

FIG. 2 shows a block diagram of an improved method for protocol processing. Therein, the protocol processing is split between the first and the second processor P1, P2. A data packet stream S1 may be received by the first processor P1, which as in case of the implementation of FIG. 1 includes a physical layer transceiver circuitry PHY. The data packets, (e.g., Ethernet frames), are received over a serial port, (e.g. a high-speed transceiver), and may subsequently be converted into a plurality of parallel data-packet sub-streams. The conversion may be performed by a serial-to-parallel converter and a parallel-to-serial converter in the opposite direction both of which may be implemented in the first processor P1, (e.g., the FPGA). The conversion may be performed by a multiplexer, MUX, that including circuitry that converts parallel data into serial data and vice-versa. The multiplexer may also take care of the exact timing for switching the data packet onto the respective sub-streams SUB1, SUB2, SUBn, and/or data packet stream S1 of the transport protocol. Hence, multiple sub-streams SUB1, SUB2, SUBn may exist after the serial-to-parallel conversion of the data packet stream S1 received. Subsequently, the protocol elements of each sub-steam SUB1, SUB2, SUBn are processed by the first processor P1 and the second processor P2. The second processor P2 may still handle the processing of the payload received. For example, a first set of protocol elements may be processed by the first processor P1 in hardware and a second set of protocol elements may be processed by the second processor P2 by software. For instance, the preamble, MAC DA, and/or CRC may be processed by the first processor P1, whereas the MAC SA may be processed by the second processor P2. A cyclic redundancy check (CRC) is an error-detecting code. Furthermore, it is possible that the second processor P2 processes the MAC DA and/or MAC SA, wherein MAC DA is the MAC destination address and MAC SA is the MAC source address. Of course, other distributions of processing of the protocol elements between the first processor in hardware and the second processor by software are possible as will be described later. For all sub-streams SUB1, SUB2, SUBn, the processing of protocol elements of the same type may be performed by the same processor. However, the case may be that for different sub-streams SUB1, SUB2, SUBn, the same protocol elements are handled by different processors as will also be described later. In some examples, more than two processors P1, P2 may be used for protocol processing, e.g., the first processor handling a first set of protocol elements, the second processor handling a second set of protocol elements, and a third processor handling a third set of protocol elements, etc., in hardware or by software. As shown in FIG. 2, each sub-stream may possess a respective processing path which includes sub-processing modules of the first and/or second processor, wherein the sub-processing modules serve for processing the individual protocol elements of the transport protocol. Furthermore, a sub-processing module of the first or second processor may serve for processing multiple protocol elements.

Figure 3:
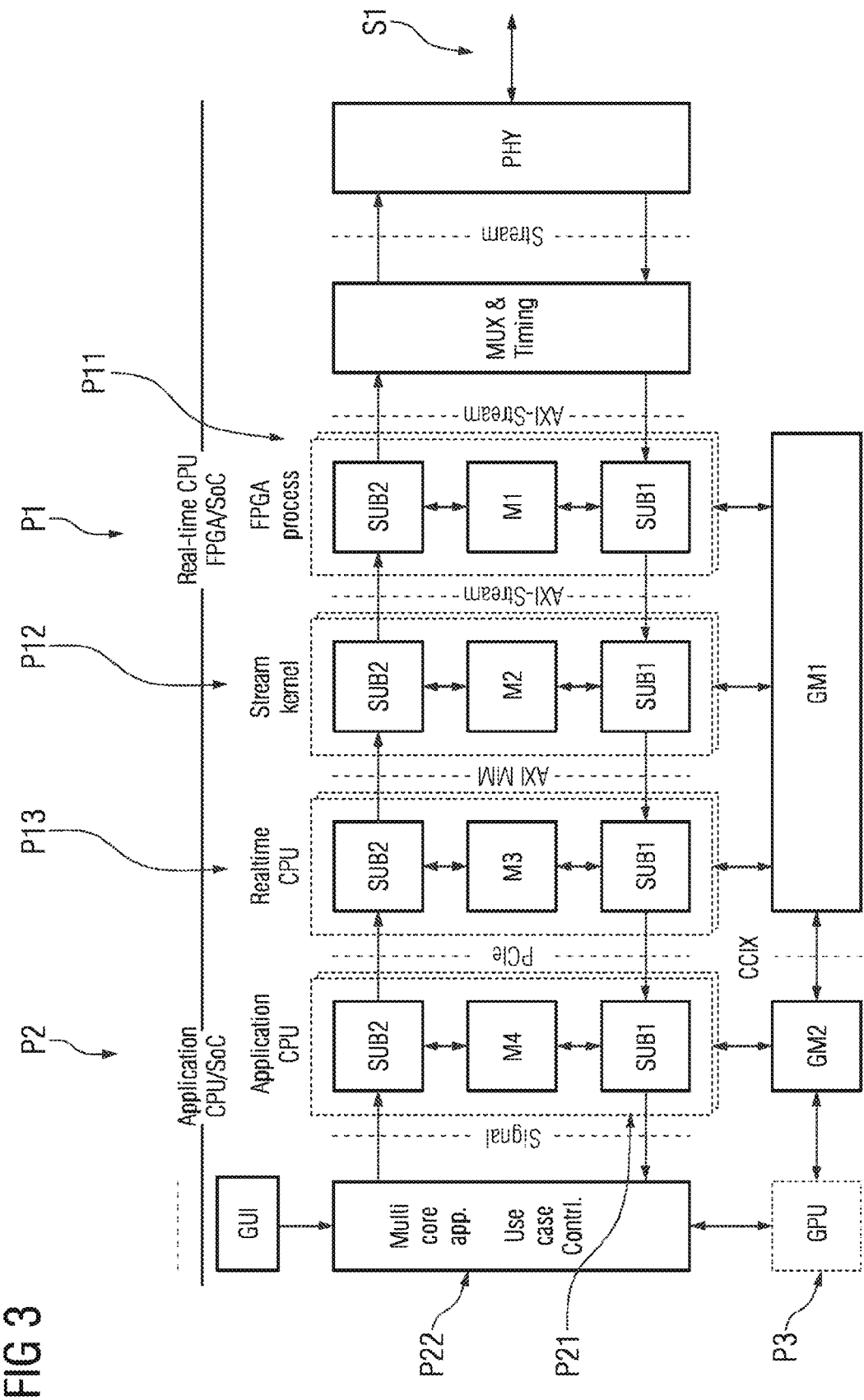
FIG. 3 depicts a block diagram of an example of an improved method for protocol processing with further details.

Now turning to FIG. 3, further details of an improved method for protocol processing with are shown. As indicated, a plurality of processors may be used for processing the protocol elements and the payload of the data packed stream received. For example, the high-speed transceiver for receiving and/or transmitting data packets of the data packet in serial form may be implemented in a first processor P1, e.g., an FPGA, as well as the serial-to parallel-converter MUX. In addition, the first processor P1 may serve for processing a first set of protocol elements of a first sub-stream SUB1 and a second sub-stream SUB2.

The sub-streams SUB1, SUB2 may be created by multiplexing the original data packet stream S1 in parallel form, and thus creating parallel processing paths along which the sub-streams SUB1, SUB2 are processed, cf. FIG. 2. For the sake of simplicity, two sub-streams SUB1, SUB2, an upstream and a downstream sub-stream, are shown in FIG. 3. However, more than the two subs-stream shown may be present and/or created, e.g. by multiplexing, as will be shown later.

A data packet is a basic unit of communication over a transport network. A packet is also called a datagram, a segment, a block, a cell, or a frame, depending on the protocol used for the transmission of data. When data has to be transmitted, it is broken down into similar structures of data before transmission, called data packets, which are reassembled to the original data chunk once they reach their destination. The structure of a packet depends on the type of packet it is and on the protocol. Normally, a data packet has protocol elements a header and a payload. The header keeps overhead information about the packet, the service, and other transmission-related data. The payload, which represents the bulk of the packet (all the above is considered as overhead) and is actually the data being carried.

Now, the data packets of the data packet stream S1 received may include data packets relating to different purposes. For example, eCPRI messages may be mapped onto a transport network layer payload. In that case, multiple eCPRI messages may be concatenated and may be encapsulated in an Ethernet frame. An example is shown in the eCPRI Specification V1.0 (2017-08-22), 3.2.3.4. Mapping Example. For example, the eCPRI messages may belong to different antenna carriers. Hence, the messages belonging to a first antenna carrier may be assigned to a first sub-stream SUB1, whereas messages belonging to a second antenna carrier may be assigned to a second sub-stream SUB2, etc.

Multiple sub-streams may exist, wherein each sub-stream is processed according to a respective processing path. A first processing path SUB1 (along which the first sub-stream SUB1 is processed) may include one or more sub-processing modules P11, P12, P13 of the first processor P1 and one or more sub-processing modules P21, P22 of the second processor P2. A second processing path (along which the second subs-stream SUB2 is processed) may include one or more sub-processing modules P11, P12, P13 of the first processor P1 and one or more sub-processing modules P21, P22 of the second processor P2. The first processor and the second processor may be a system on a chip (SoC). The SoC may possess more than one core or sub-processing module.

The protocol processing for different sub-streams SUB1, SUB2 is thus divided into parallel sections based on, for example, a data source or a message type. Message type may be the types shown in eCPRI Specification V1.0 (2017-08-22), 3.3.4 Message Types.

Each parallel processing includes an exact timing requirement when traffic may be on the processing path. The timing of the data packets on the processing paths may be performed by the multiplexer which may be configured according to timing information received, e.g., from an application processor, for example, the second processor P2. The number of parallel sub-processing modules and thus parallel processing paths may vary and depend on the data amount, bandwidth available, and/or latency required.

Further details of arranging one or more sub-processing modules for processing a data stream are described in U.S. Patent Application Publication No. 2018/0013608 A1. Additionally, as shown in FIG. 3, a GPU or other processor for accelerating the protocol processing may be provided.

Each sub-stream and corresponding processing path may include its own memory M1, M2, M3, M4, or may share a memory with one or more other sub-streams or processing paths. Additionally, a global memory 1 and/or a global memory 2, which may be accessed by a plurality or all of the sub-streams or processing paths and/or processors P1, P2 may be provided.

The sub-processing modules may be communicatively coupled using different buses, such as PCIe, between the first and second processor P1, P2 and, on the other hand, AXI4 (memory mapped) and/or AXI4-Stream, or another protocol for on-chip communication, between the sub-processing modules of the first processor P1, as applicable. AXI, Advanced eXtensible Interface, is a parallel high-performance, synchronous, high-frequency, multi-master, multi-slave communication interface, mainly designed for on-chip communication.

As shown in FIG. 3, a graphical user interface, GUI, (e.g., on a host workstation), may be provided by way of which a user may control and/or configure the processing of the protocol elements. For example, a user may control the creation, update and distribution of the target code to be executed by the respective processor P1, P2 and/or one or more of the sub-processing modules P11, P12, P13, P21, P22.

In the case of eCPRI, the second processor P2, (e.g., the application processor), may serve for payload, and other non-runtime related processing. For example, the second processor may serve for configuring and/or storing radio channel models and/or for creating stimulus data for transmission to a DUT over the transport network, for example, based on the one or more radio channel models. Furthermore, the second processor P2 may serve for configuring the sub-processing modules and/or for configuring the timing of the multiplexer MUX. The protocol processing is spread over different sub-processing modules dependent on their time accuracy, (e.g., latency requirement(s) and/or bandwidth requirement(s)). For example, 5G NR symbols can be stored in the global memory 1 and data transmissions to a DUT, e.g., one or more antennas, may processed by the first processor P1 in hardware, e.g., the sub-processing modules P11, P12, P13, for example, of the FPGA of the SoC shown.

In many transport protocols, some of the (protocol processing) operations do not require a rapid response to newly arriving data packets or traffic in general. Therefore, such high latency tasks may thus be accomplished by a general purpose processor and/or software program code executed by a processor P2. Also, the amount of data to be processed (during runtime) may decrease in these cases. Specifically, one or more task for processing one or more protocol elements (by software) may thus be transferred to the second processor P2. The other extreme is the fast and continuous protocol functions that are implemented in hardware, e.g., by FPGA switching. Also, the amount of data to be processed may be significant in assigning the processing tasks to the individual processors. For example, in case of low response time requirements, packets are generated by the first processor, e.g., an FPGA, and only non-critical protocol elements, such as control plane management, are then generated on the second processor P2, e.g., a general purpose processor, e.g. a CPU.

In FIG. 4, different processing requirements and the distribution of the corresponding processing tasks onto the available processors and sub-processing modules are shown. Depending on the requirements, part of the processing is transferred to the first processor P1, e.g., an FPGA, or one or more second processors P2. Where low latency and a high data rate or bandwidth is required, the processing is assigned to the first processor P1 and its sub-processing modules P11, P12, P13. With more relaxing requirements regarding the latency of protocol processing, the processing tasks may be assigned to the second processors P2.

Turning to FIG. 5, protocol processing may be designed and written in a main program code MC, for example, in C/C++ or another higher-level language utilizing multitasking. The main program code MC may be divided before or during compile time. The block diagram of FIG. 5 shows how one main program code MC for protocol processing code can be divided into separate target codes which are executed by different processor P1, P2 or processing sub-modules P11, P12, P13 of the respective processor P1, P2.

Protocol processing is involved in any exchange of information. The protocol may contain packets. The packets are created by the sender and reassembled at the receiver, while providing adherence to protocol specifications. Consequently, protocol processing, and implementing protocol processing functionality efficiently, is important when designing a processor architecture and creating program code.

The main program code MC may include instructions for processing different protocol elements of data packets of a data packet stream. The protocol elements may correspond to control and/or signaling data required for payload data to reach its destination. The protocol elements may correspond to the protocol overhead. The protocol elements may thus be required to reliably send a payload of data over a transport network. The protocol elements may correspond to the elements of the Ethernet frame. For example, the protocol elements may include a preamble, a start of frame delimiter, a MAC destination address, a MAC source address, an 802.1Q tag, an Ethertype (Ethernet II) or length (IEEE 802.3), Frame check sequence, e.g., 32-bit CRC, and/or interpacket gap. The protocol elements may include or exclude payload data. The protocol elements may correspond to the eCPRI common header. For example, the protocol elements may include eCPRI Protocol Revision, C (indicating concatenation), eCPRI Message Type, and/or eCPRI Payload Size. Hence, the protocol elements may include or exclude the payload of the eCPRI packet.

The main program code MC may include one or more code segments. Hence, the main program code MC may be monolithic or modular, as the case may be. Each of the code segments may include one or more instructions for processing one or more protocol elements of (data packets of) a data packet stream of a transport protocol. The transport protocol may correspond to an ISO OSI layer 2 protocol, (e.g., a data link layer protocol, such as Ethernet). The transport protocol may correspond to an ISO OSI layer 4 protocol, (e.g., a transport layer protocol, such UDP). The transport protocol may be a combination of a data link layer protocol and a transport layer protocol, such as eCPRI. The transport protocol may be an ISO/OSI layer 2, (e.g., data link layer), and/or layer 3, (e.g., network layer), protocol. The transport protocol may thus be Ethernet or eCPRI or may include both, Ethernet and encapsulated eCPRI (Radio over Ethernet, RoE). The transport protocol may thus be or may include Radio over Ethernet, RoE.

The main program code MC and/or the code segments may be in the form of a source code, e.g., C or C++. The code segments may be compiled, which may or may not include synthesis, to yield respective target codes. To that end, a first code segment may be compiled, e.g., by a compiler C1, C2, C3, C4, in order to obtain a first target code wherein a second code segment may be compiled, by another one of the compilers C1, C2, C3, C4, to obtain a second target code.

A first code segment may be compiled by synthesizing, e.g., by compiler C1 and/or C2, a first code segment. Thereby, the code segment may be translated into RTL code using HDL and may then be turned into a design implementation of the underlying hardware, e.g., the first processor and/or the sub-processing modules P11, P12, P13, e.g., a SoC including a reconfigurable FPGA.

A second code segment may be compiled, e.g., by the compiler C3 or C4, into bytecode. Bytecode is a binary representation of program code that is an intermediate representation between source code and machine code. Bytecode may be more "portable" than machine code, meaning that bytecode tends to reduce code dependence on a limited set of hardware and/or operating system environments. At the same time, bytecode may also be more efficient than source code in that the bytecode may be translated into machine code (also called "native machine language") during runtime much faster than source code can be translated into machine code. Bytecode may be further "compiled" into native machine language for execution, or it may be executed on a virtual machine that "interprets" the bytecode as it runs. Different sections of the bytecode used in a single program can be handled in different ways. For example, some sections may be compiled, while others are interpreted.

A latency requirement and/or bandwidth requirement may be assigned to the main program code or one or more of the code segments. The assignment may include a flag, a pragma, and/or one or more parameter settings in separate file. In case of a flag, a priority may be assigned to the code segment. For example, the flag may indicate one of a plurality, (e.g., two), priorities for executing the code segment. The priorities specifying high or low latency requirements for respective code segment. A pragma may specify how a respective code segment is compiled. This has the effect of altering the behavior of the compiler. Thus, by way of a pragma, it is specified how the compiler (or other translator) may process the input main program code or code segment. Hence, by way of the pragma only affect a local section, e.g., a code segment of the main program code may be affected. In the separate file, parameters for the respective code segment may be set, e.g. by a user. The parameter settings may reflect the latency requirement and/or bandwidth requirement for the respective code segment, e.g., as shown in FIG. 4, where the latency and data rate requirements are illustrated. A user may assign the requirements to the main program code and/or to one or more code segments of the main program code, e.g. using a graphical user interface, GUI, as described in the above. Furthermore, via control messages, e.g. using a GUI, a user may change the distribution and execution of the main program code, for example, at runtime of the main program code or one or more its code segments.

Now, based on the assigned requirement, the code segments may be compiled. For example, based on the requirement, a different target code may be created. To that end, a compiler C1, C2, C3, C4 or compiler function may be chosen based on the requirement assigned to the respective code segment. For example, the target code for the first processor, e.g., an FPGA, and the first sub-processing module P11 may be compiled or synthesized using a first compiler C1, e.g., Mentor Graphics' Catapult-C for C-synthesis and/or Xilinx VITIS. The target code for the second sub-processing module P12, e.g., a stream processor, vector processor or kernel such as Microblaze or ACAP, may be compiled using a hardware specific gcc compiler, for example, Xilinx VITIS toolchain (which includes a gcc compiler for MicroBlaze or ACAP). A third sub-processing module P13 may be an is aarch64 (64-bit ARM core), for which a standard gcc compiler C3 may be used. In that case, a bare-metal gcc compiler or real-time specific OS gcc compiler may be used. For the sub-processing module of the second processor P2, e.g., in a standard Linux/Windows environment, again gcc may be used as a compiler C4, for example, Microsoft Visual Studio compiler. Hence, different target codes for the respective processor or their submodules may be obtained. Those target codes may then be distributed onto the processors for execution. A user can configure which part of the protocol processing is compiled/synthesized to which hardware element, e.g., processor. The communication between the different target codes running on the different processors may be enabled by a runtime environment. The runtime environment may allow communication and, to that end, establish connections between the target codes on the different processors or sub-processing modules. Such a runtime environment may include one or more protocol and/or busses, e.g., PCIe and/or AXI, as mentioned in the above, that allow communication between the different target codes running on the different processors.

The design and programming of the target code may be performed using a high level synthesis tool. The high level synthesis tool may be used by a user to develop one or more register transfer level, RTL, programs. Each register transfer level program includes definition and description for one or more operations to be performed by the target code. Each register transfer level program may be written using a high level programming language such as ANSI C++. For example, Intel HLS Compiler is a high-level synthesis (HLS) tool that takes in untimed C++ code as input and generates production-quality register transfer level (RTL) code, which in that case is optimized for Intel® FPGAs.

Thus, the main program code MC may be compiled in order to be executed in hardware and by software depending on the specific requirements set for the code segments of the main program code MC.

Figure 6:
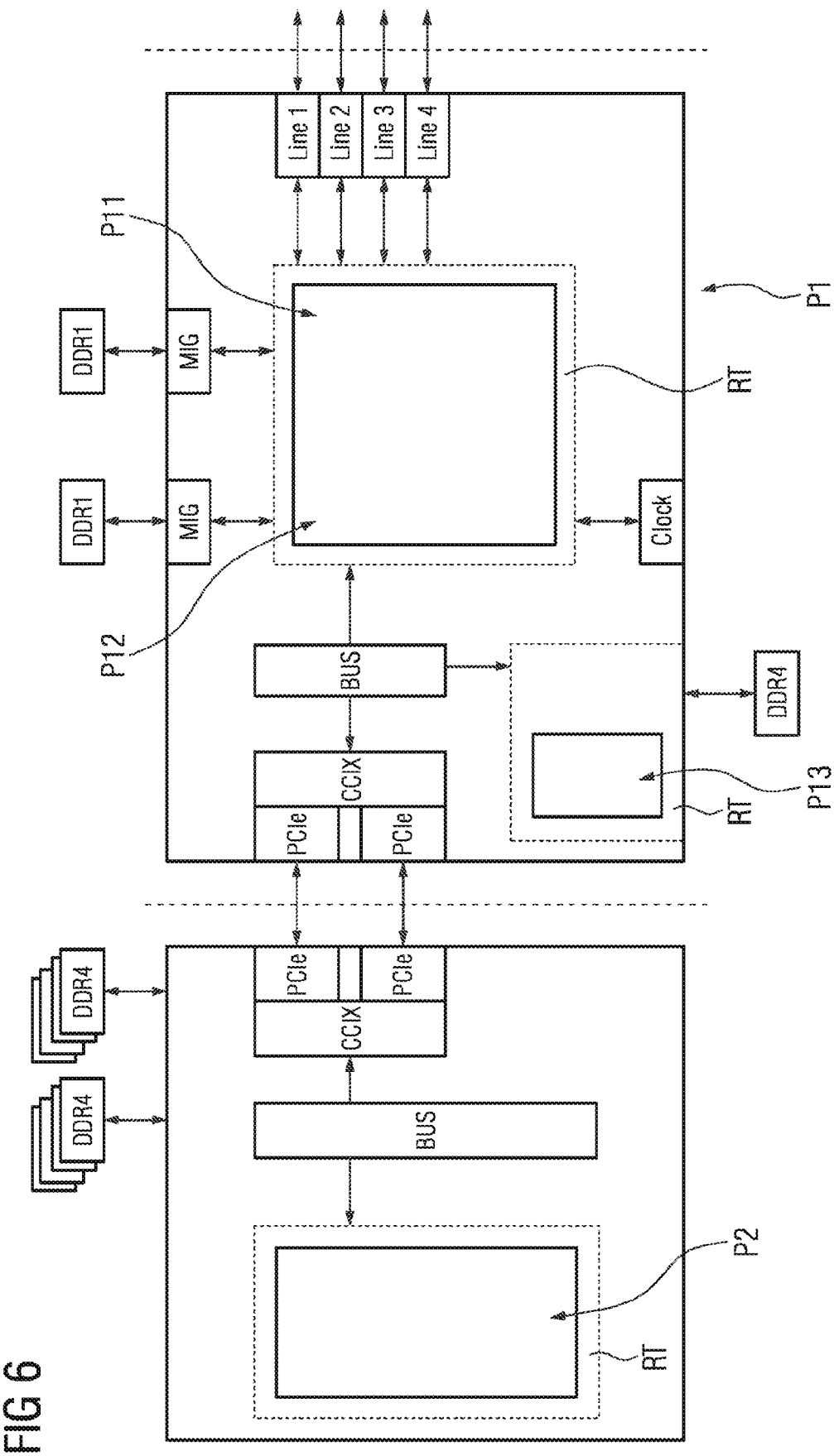
FIG. 6 depicts an example of the processing of different protocol parts by different processors.

Now turning to FIG. 6 where further details regarding the processing of different protocol elements or parts by different processors P1, P2 and their respective sub-processing modules P11, P12, P13 are shown. A system may include multiple processors P1, P2 with different processing capabilities. The target codes as created, e.g., as described in FIG. 5, may be distributed to the respective processors P1, P2. For example, a first processor P1, which may be a System-on-a-Chip, SOC, may include multiple sub-processing modules P11, P12, P13. The first sub-processing module P11 may serve for executing a first target code and a second sub-processing module P12 may serve for executing a second target code. In the present case the first and second sub-processing modules P11, P12 may be different parts, (for example, one or more different logic blocks), of an FPGA. The first processor P1 may include another sub-processing module P13 separate to the FPGA. The first processor P1 may thus include a third sub-processing P13 module in the form of a co-processor that serves for executing a third target code. A second processor P2 may execute a fourth target code. Of course, the second processor P2 may also include multiple sub-processing modules which serve for processing a respective target code.

A data packet stream may be received by the first processor, e.g., via transmission lines 1-4, and may process a first set of protocol elements according to the instructions of the first target code and may process a second set of protocol elements according to the instructions of a second target code. The first processor may also process a third set of protocol elements according to the instructions of the third target code. The second processor may process a fourth set of protocol elements according to the instructions of the fourth target code. Communication between the processors and its sub-processing modules may be enabled by a bus connecting, e.g., the first processor with the second processor and/or the first, the second and the third sub-processing module, as the case may be.

As shown in FIG. 6, memory modules DDR4 may be communicatively coupled to the respective processor P1, P2 and to the sub-processing modules P11, P12, P13.

Figure 7:
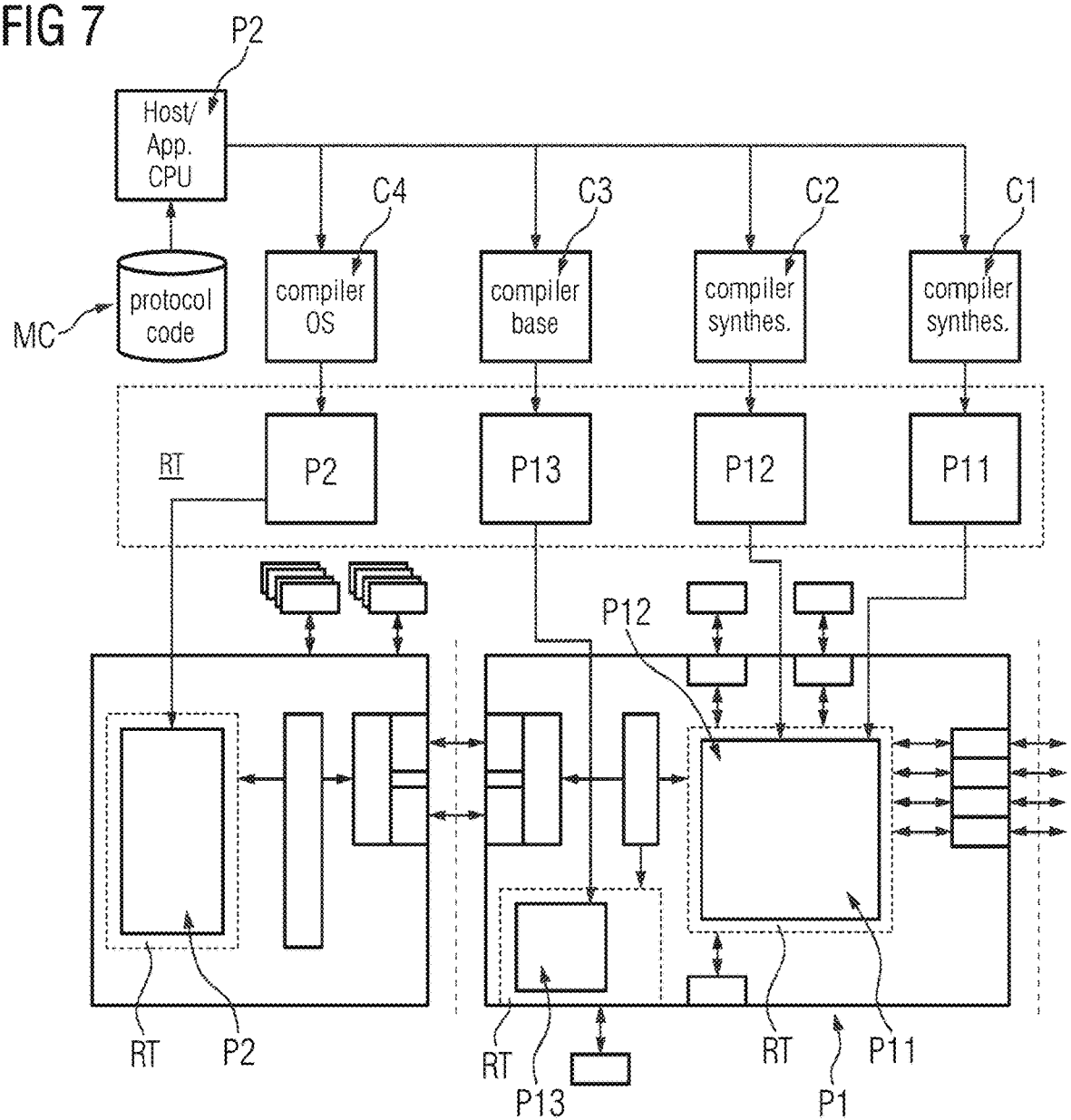
FIG. 7 illustrates an example of the distribution of the target codes to the different processors.

FIG. 7 illustrates the distribution of the target codes to the different processors P1, P2 and sub-processing modules P11, P12, P13. Depending on the requirement(s) assigned to the respective code segment, the target code may be created and distributed to the processor P1, P2 possessing the processing capabilities required. The distribution may be performed when an update of one or more of the target codes is necessary. That target code(s) may then be updated once the updated target code(s) is compiled, e.g., during runtime of target code on the respective processor P1, P2 or sub-processing module(s).

Figure 8:
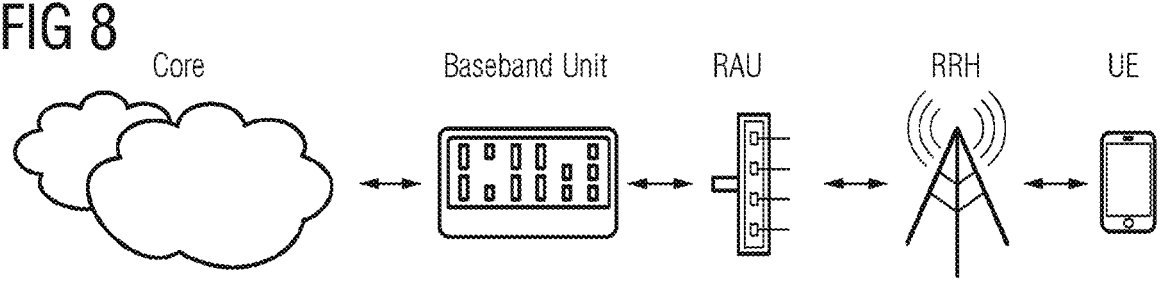
FIG. 8 depicts of an example of a radio communication system.

FIG. 8 shows an illustration of a radio communication system. In particular, the method and system proposed enables implementing the appropriate timing advances and compensating for the delay variations of packets coming from different network stations, such as BBUs, RRHs and/or UEs. Furthermore, radio data, e.g., associated with beam IDs, is extracted from received packets at the appropriate symbol period and may be forwarded for further processing, for example, to a beamforming function.

In FIG. 8, a radio communication system is illustrated. The traditional monolithic base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over one or more radio frequency channels. The RRH performs radio frequency processing to convert baseband data output from the BBU to radio frequency signals for radiating from one or more antennas coupled to the RRH and/or to produce baseband data for the BBU from radio frequency signals that are received at the RRH via one or more antennas. The RRH may be installed near the one or more antennas, (e.g., at the top of a tower), and the BBU may be installed in a more accessible location, (e.g., at the bottom of the tower). However, as the case may be RRH and BBU may be collocated, e.g., in a lab. The BBU and the RRH may be connected through one or more fiber optic links. The interface between the BBU and the RRH is defined by fronthaul communication link standards such as the Common Public Radio Interface (CPRI) family of specifications, the Open Base Station Architecture Initiative (OBSAI) family of specifications, and the Open Radio Interface (ORI) family of specifications.

In the 5G architecture, a new frequency domain fronthaul interface will be specified. The frequency domain fronthaul is a functional split where the IFFT/FFT (Inverse Fast Fourier Transform/Fast Fourier Transform) may be moved from the BBU to the RRH. Frequency domain samples instead of time domain samples are sent over the fronthaul. The RRH will have information through a communication channel about the resource al-location for different UEs. The new eCPRI interface specification "eCPRI Specification V1.0 (2017-08-22)" is already available.

For the deployment scenario where the remote radio head, RRH, (sometimes also denoted as Radio Remote Unit, RRU or simply Radio Unit, RU) and the baseband unit, BBU, (sometimes also denoted as radio equipment controller, REC or Distributed Unit, DU) are separated, the signals received from one or more antennas have to be transported over the media that is connecting the RRH with the BBU as normally the signal combination is done at the BBU. The interface used for the connection between the BBU and the RRH may be called the fronthaul. The signals over the fronthaul may be complex time domain samples such as specified in the legacy Common Public Radio Interface, CPRI. Digitized waveforms may be transported over the fronthaul from the BBU to the RRH, and vice versa, via one or more radio aggregation units (RAU).

The user equipment's, UE, signals are power limited and as the path loss varies with the distance to the UE a large dynamic range is encountered when those signals are represented digitally, it may be assumed that for the complex frequency sample a large number of bits will be required and in the case of MIMO (Multiple Input Multiple Output)/diversity layers the required fronthaul capacity will multiply with the number of antennas. Furthermore, it is desired to model such propagation of radio signals in order to test the functionality of the radio system and its components. As the capacity on the fronthaul is limited, it is desired to find methods that optimize the usage of the fronthaul. As illustrated, the BBU may be connected to a core network, Core, and possibly to other BBUs (not shown) via one or more backhaul or cross-haul connections.

Figure 9:
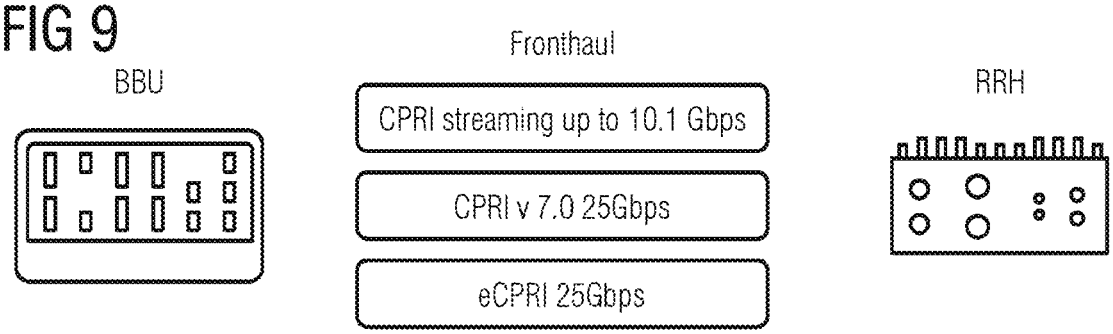
FIG. 9 depicts an example of a fronthaul data transmission between a baseband unit and a remote radio head.

In FIG. 9, fronthaul data transmission using different protocols is illustrated. As mentioned, the different protocols employed have different bandwidth capacities. Hence, the CPRI streaming supports up to 10.1 Gbps, whereas CPRI v7.0 supports 25 Gbps, and eCPRI supports up to 25 Gbps (per single line), e.g., between the RRH and the BBU.

I/Q data, (in-phase and quadrature components data), is digitalized air-interface data. The sample rate is in 5G is 122.88 MHz. Thus, especially in case of multiple radio channels, a high amount of data needs to be transmitted via the fronthaul. I/Q data transmission may occur in uplink and downlink direction for each radio channel.

Figure 10:
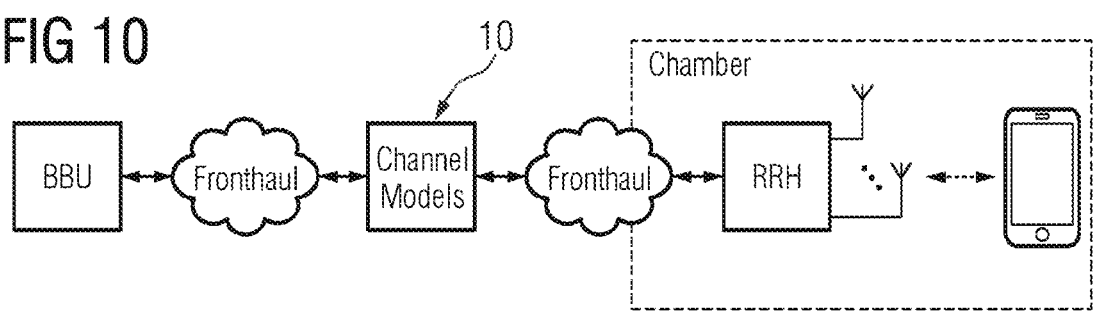
FIG. 10 depicts an example of a system for testing radio equipment.

In FIG. 10, a testing environment for testing radio equipment is illustrated. SIEMENS is developing innovative test systems for ASIC and FPGA verification and validation in the areas of simulation, hardware emulation, Field Programmable Gate Array (FPGA) prototyping, and real time (post-silicon, manufacturing) environments. Such test systems may include one or more test devices 10 that can be utilized in a variety of high-tech fields, ranging from cellular base stations to the automotive industry. For example, a radio equipment test system or test device 10, e.g., from the X-STEP product line, allows stimulation and tracing of all the digital interfaces in a modern radio equipment such as a radio equipment control (REC) and/or radio equipment (RE) modules (also known as baseband unit, BBU, and remote radio head, RRH, respectively). The digital interface protocols supported by such a test device may include JESD204B, CPRI, OBSAI RP3, and 10G Ethernet. A test device 10 may further include in register-transfer level (RTL) simulation and hardware emulation and may also work with FPGA prototyping, real-time post-silicon board debugging and final product testing. The test device 10 may cover every phase in a radio base station product development cycle, ranging all the way from very first RTL simulations to post-production. The same tests can then be re-used in every phase of the product development cycle of a device under test, DUT. Also, due to the parameterized test case building block architecture, the porting of test cases from one project to another is facilitated.

As illustrated in FIG. 10, the test device 10 is arranged between the BBU and the RRH and communicatively coupled to the BBU and the RRH via a respective fronthaul connection. However, other test setups including the test device 10 have become known. For example, in international application PCT/US2019/055623 and European application EP18200162, respectively, different test systems and arrangements are disclosed. Therein the test device 10 can be coupled to a BBU or RRH only. To that end simulation or emulation of one or more UEs can be performed by the test device 10. Alternatively, the test device 10 can be coupled to an RRH. To that end, the BBU can be emulated or simulated by the test device 10. In those cases, the device or devices connected to the test device 10 may be considered the devices under test, DUT, as the digital signal processing and the functioning of those devices may be tested whether they are working according to the specified requirements. A channel model is a (test-)model for the behavior of one or more radio signals transmitted over the air interface. This channel model enables the testing of radio equipment in lab environments or even on-site. For example, a channel model test device 10 may be used that performs the processing of the radio frequency signals, e.g., in the form of I/Q data, according to one or more channel models. All connections, e.g., between the base station and/or the test apparatus and/or the UE, may be made by coaxial cables.

As mentioned earlier, radio base station systems rely on various types of digital IC designs, in the form of FPGA or ASIC chips. The development and verification of these IC designs require realistic counterparts for the external digital RF interfaces of the chip. In particular in the case of pre-silicon testing the simulated or emulated DUT can process data only a lower speed than the test device. Hence, a reduction of the transmission rate of the test device is required. To work around the transceiver limitation of the DUT, an external optical-to-electrical conversion and buffering unit may be configured to connect the test device to a slow-running prototype for verifying fronthaul interfaces early, in the pre-silicon phase. However, no matter how large buffers there are, they would eventually overflow if the transmitting side (e.g., the test device) is not slowed down according to the slow-down factor of the prototype. A flow control is required on the test device side, in addition to implementing the external converter/buffering unit itself.

To face the ever-increasing amount of data to be transmitted and processed, especially in the case of beamforming, an improved design of the processing architecture, in particular for the test device 10, is required. Another test scenario in which the exact timing information for data packet transmission over the transport network is necessary may be found in CPRI 2.0 specification, chapter 3.2.4.6. Message Type #5: One-Way Delay Measurement.

Figure 11:
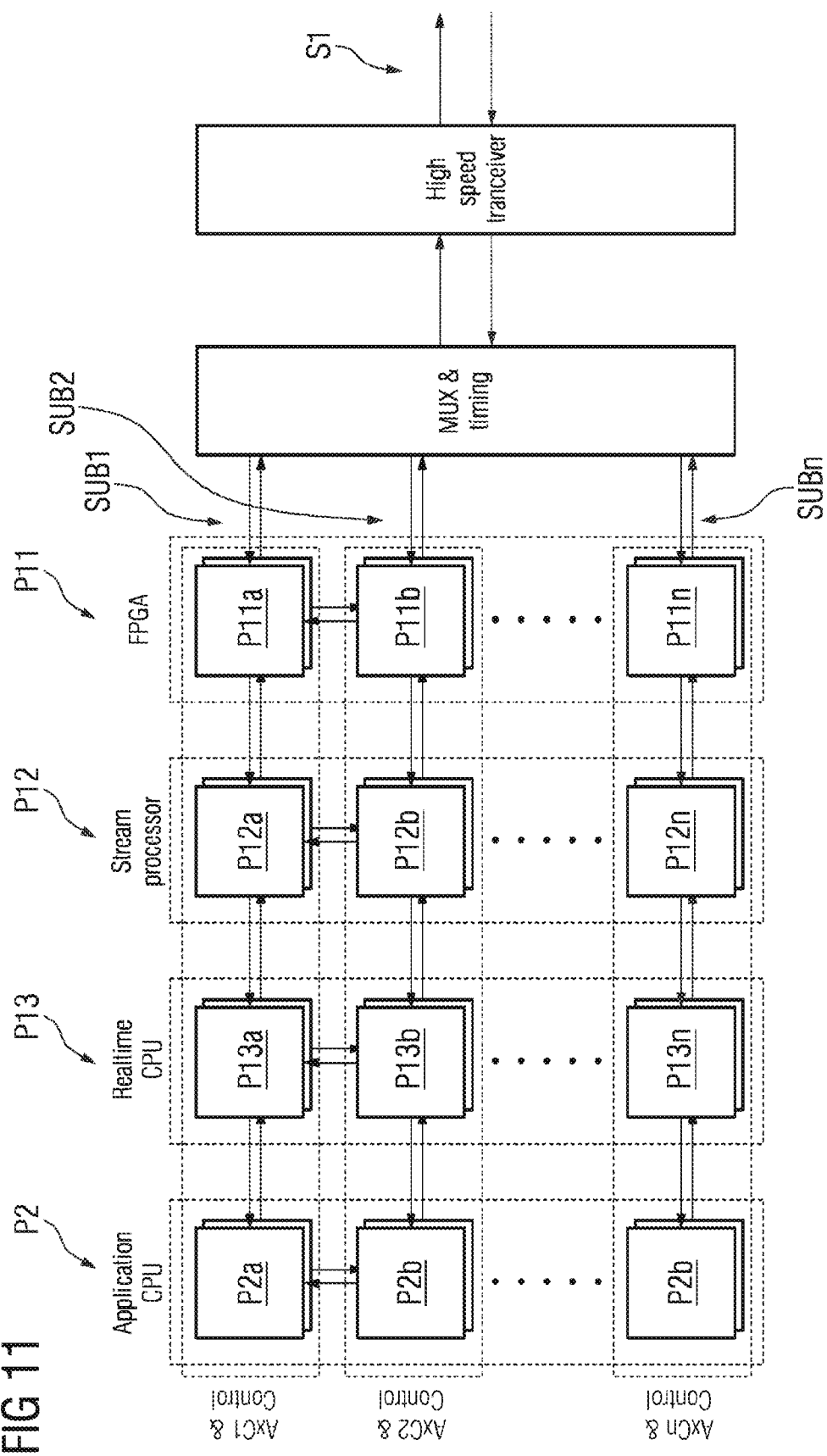
FIG. 11 depicts an example of the processing of different data packet streams representing antenna carriers.

To meet those requirements, a method and system for processing one or more data streams is proposed as shown in FIG. 11. Here, the system setup is similar to the one of FIG. 3. The data packet stream S1 between the test device 10 and the DUT is divided into multiple sub-streams, each of which corresponds to an antenna carrier AxC1, ..., AxCn. The sub-stream SUB1, SUBb2, SUBn may then be processed in parallel, e.g., according to a respective processing path. For example, the eCPRI protocol can be divided into subs-streams for each antenna carrier AxC1, ..., AxCn. The processing of the protocol elements is performed by the respective processor and the sub-processing modules of the respective processing path. The first sub-stream SUB1 may be processed along the processing path including the sub-processing modules P11a, P21a, P13a and P2a. The second sub-stream SUB2 may be processed along the processing path including the sub-processing modules P11b, P21b, P13b and P2b. The nth sub-stream SUBn may be processed along the processing path including the sub-processing modules P11n, P21n, P13n and P2n, e.g., logic blocks of the FPGA or a co-processor. Therein, the sub-processing modules P11a, P11b and P11n may be part of a sub-processing module P11 that serves for processing one or more protocol elements, e.g., a first set of protocol elements. The same protocol elements are processed by the sub-processing module P11 for all the sub-streams. The same is true for the second sub-processing module P12 that may include further sub-processing modules P12a, P12b, P12n for processing the same protocol elements for all of the sub-streams SUB1, SUB2, SUBn—however the protocol elements processed by the sub-processing module P12 are different than the protocol elements as processed by the sub-processing module P11. The same is true for the sub-processing module P13 of the first processor. Finally, the second processor is also used for processing the different data packet streams by its respective sub-processing modules P2a, P2b, P2n. The processor and their respective sub-processing units are integrated in a (e.g., radio equipment) test device as described earlier.

The CPRI standard defines AxCs (antenna carriers) for transmission and reception of the digital I/Q data, cf. CPRI Specification V4.0 (2008-06-30). An AxC is a container for one I/Q sample. An antenna carrier (AxC) may correspond to IQ data which reflects the radio signal, sampled and digitized, of one carrier at one independent antenna element. The IQ data may, for the purpose of testing, be generated or replayed by the test device. That is to say, the IQ data serves as stimulus for the DUT and is stored on the test device, cf. FIG. 10, and may then be transmitted to the DUT. Subsequently, the response of the DUT is received by the test device and may be analyzed, displayed and/or stored.

In the case of eCPRI, the application CPU, (e.g., the second processor P2), includes control, payload, and other non-runtime control. Runtime protocol processing is spread over different processing stages, (e.g., processors P1, P2), depending on the required latency and bandwidth and/or time accuracy in general. For example, all 5G NR symbols can be stored in global memory, e.g., as shown in FIG. 3, and individual antenna data transmissions generated while running on the FPGA circuit. In many protocols, some of the operations do not require a rapid response to traffic, which can be accomplished by a software-based processing. Also, the amount of data may decrease in these cases. The other extreme is the fast and continuous protocol functions that are implemented in hardware, e.g., FPGA switching. Also, the amount of data, and thus the bandwidth available, may be significant for the processing requirement(s).

The object is to provide a test device, such as X-STEP product family, with better support for protocols, e,g., stateful protocols, also known as two-way protocols. It is another object to provide a faster and more flexible way to develop protocol support for a test device. It is yet another object to reduce the total demands on the FPGA/ASIC circuit. Together these allow for a more cost-effective implementation and better protocol support for testing can be provided.

The processing of protocol elements is divided into parallel and/or sequential (sub-) processing modules. Thereby, the different protocol elements can be processed according to different requirements at different processing stages, e.g., on different hardware elements and/or processing may be split into software-based and hardware-based processing. Different parallel sub-streams can be processed in different ways depending on latency requirements or bandwidth requirements of a data packet stream. In addition, every stream can be re-configured during run time, e.g. by updating the respective processor and/or sub-processing module.

The test device may mimic either the baseband unit and/or a radio unit in a test setup. In the antenna interface of a remote unit, the test device may mimic JESD204B/C ADC/DAC devices, send antenna stimulus into the radio unit, or capture antenna data from the radio unit, e.g., for radio performance analysis. The test device may operate on physical and data link layers, (e.g., OSI layer 1 and OSI layer 2), and provide bit-accurate visibility into stimulus and captured data with physical and framing error injection and detection capabilities. The test device may provide, e.g., file-based, access to all channels of the interface protocol, allowing control & management of payload and individual antenna carriers to be generated, and post-processed through algorithmic models.

Figure 12:
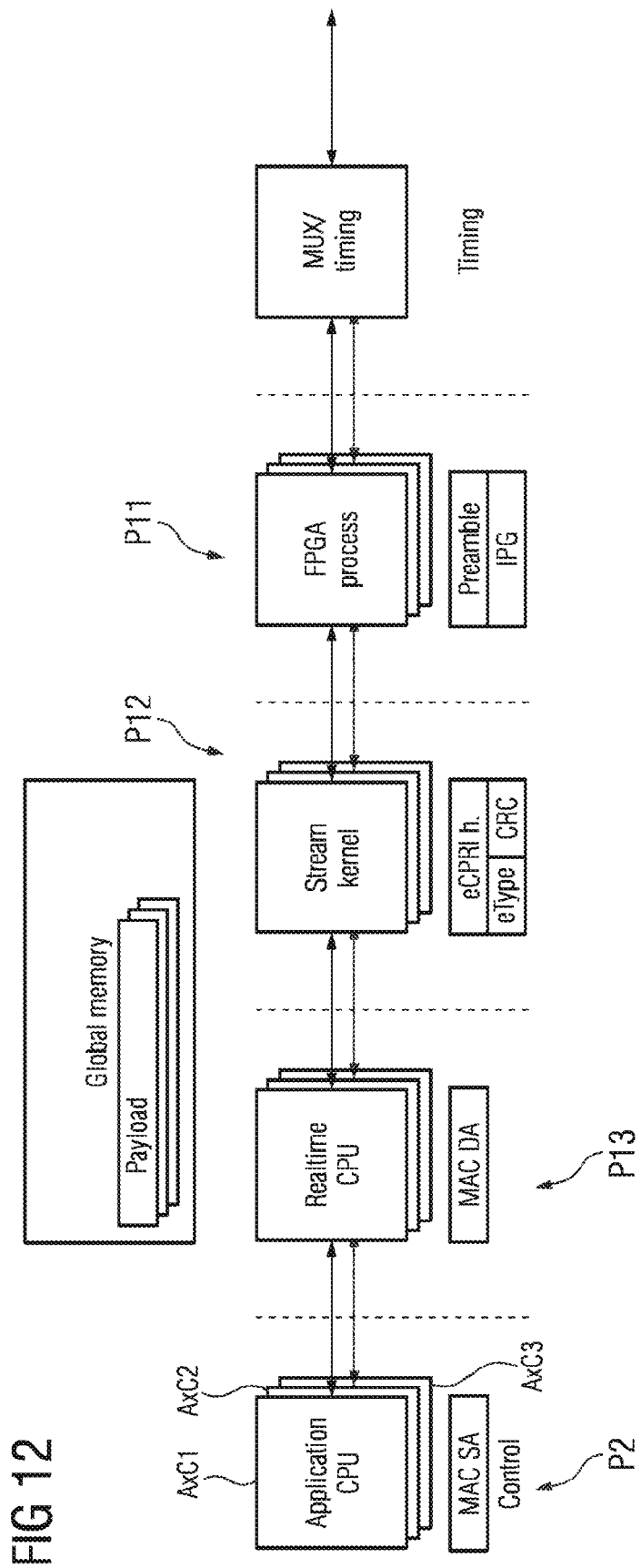
FIG. 12 depicts further details of an example of data packet stream processing by different processors.

FIG. 12 shows further details of data packet stream processing by different processors. After creating a sub-stream the protocol elements of the sub-stream may be processed by different processors, either in hardware or by software. The upstream or downstream data packet stream is encoded or decoded, respectively, by a transceiver, e.g., as shown in the previous Figures. Decoding may include translating an electrical signal from a serial bus, such as the transport network, into a bit sequence. In the present example, a first processor P1 serves for processing the preamble and in case present an inter packet gap, e.g., by a sub-processing module P11. The first processor, e.g., by a second sub-processing module P12, may serve for processing the Ethernet Type, eType, the CRC and an encapsulated eCPRI common header. The processing of the first and second protocol element may be performed by a first and a second sub-processing module of the first processor P1. A third sub-processing module P13 of the first processor P1 may serve for processing the MAC destination address, MAC DA, whereas a second processor P2 may serve for processing the MAC source address, MAC SA. The sequence of processor and/or sub-processing modules may form a processing path. The payload in the data packets of the respective sub-steam may be written in a (global) memory or received from that (global) memory, cf. FIG. 3. The creation of the sub-streams is performed by a multiplexer, MUX, which switches the data packets that belong to the respective sub-stream onto that sub-stream and processing path. As indicated in FIG. 12 by AxC1, AxC2 . . . the processing of the individual sub-streams may be performed in parallel for other sub-streams created.

Figure 13:
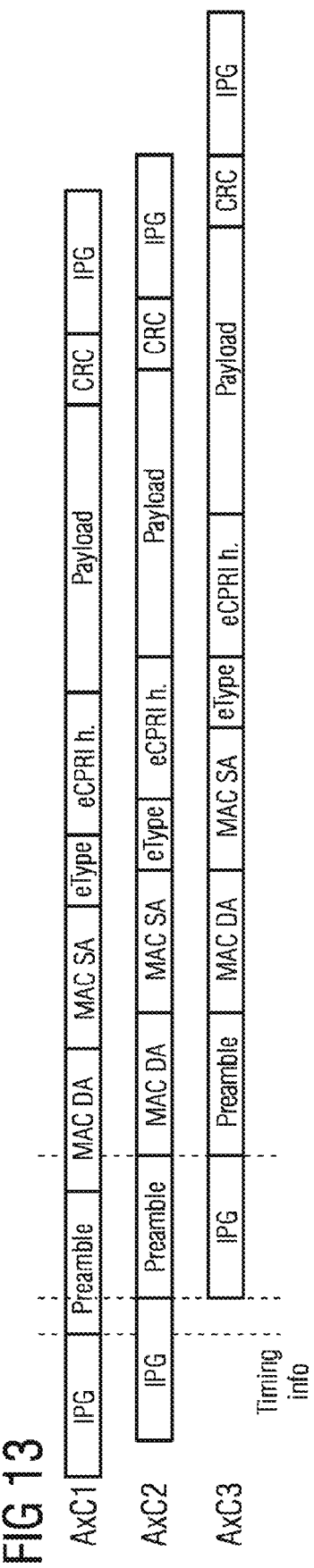
FIG. 13 depicts further details of an example of processing of multiple sub-streams.

FIG. 13 shows further details of parallel processing of multiple sub-streams. Herein, the timing offset between the parallel sub-streams corresponding to the Antenna carriers AxC1, AxC2, AxC3 is shown. As mentioned, the timing offset between the data packets may be necessary for performing testing, e.g., such as a One-Way Delay Measurement as described in eCPRI 2.0 specification, chapter 3.2.4.6. Message Type #5: One-Way Delay Measurement. The sub-streams may correspond to the different antenna carriers as also already mentioned. Instead however, another division of the data packet stream into multiple sub-streams may be performed. The respective off-set or timing information may be controlled by the application processor, e.g., the second processor P2 as shown in FIG. 3 and FIG. 12. This timing information is used by the multiplexer to switch the data packets and protocol elements onto the respective sub-stream. The timing information may relate to the time of arrival of those data packets at the multiplexer, MUX, and/or may related to the transmission over the antenna. This is of particular importance when beamforming is used, because unlike MIMO, which sends a different spatial stream on each antenna, beamforming sends the same stream on multiple antennas with deliberate timing offsets to increase range. The phase of each data stream is transmitted by all antennas at different times (e.g., with different phase offsets) that are calculated so to have these different signals constructively interfere at a particular point in space (e.g., the location of the receiver), thereby enhancing the signal strength at that location.

Figure 14:
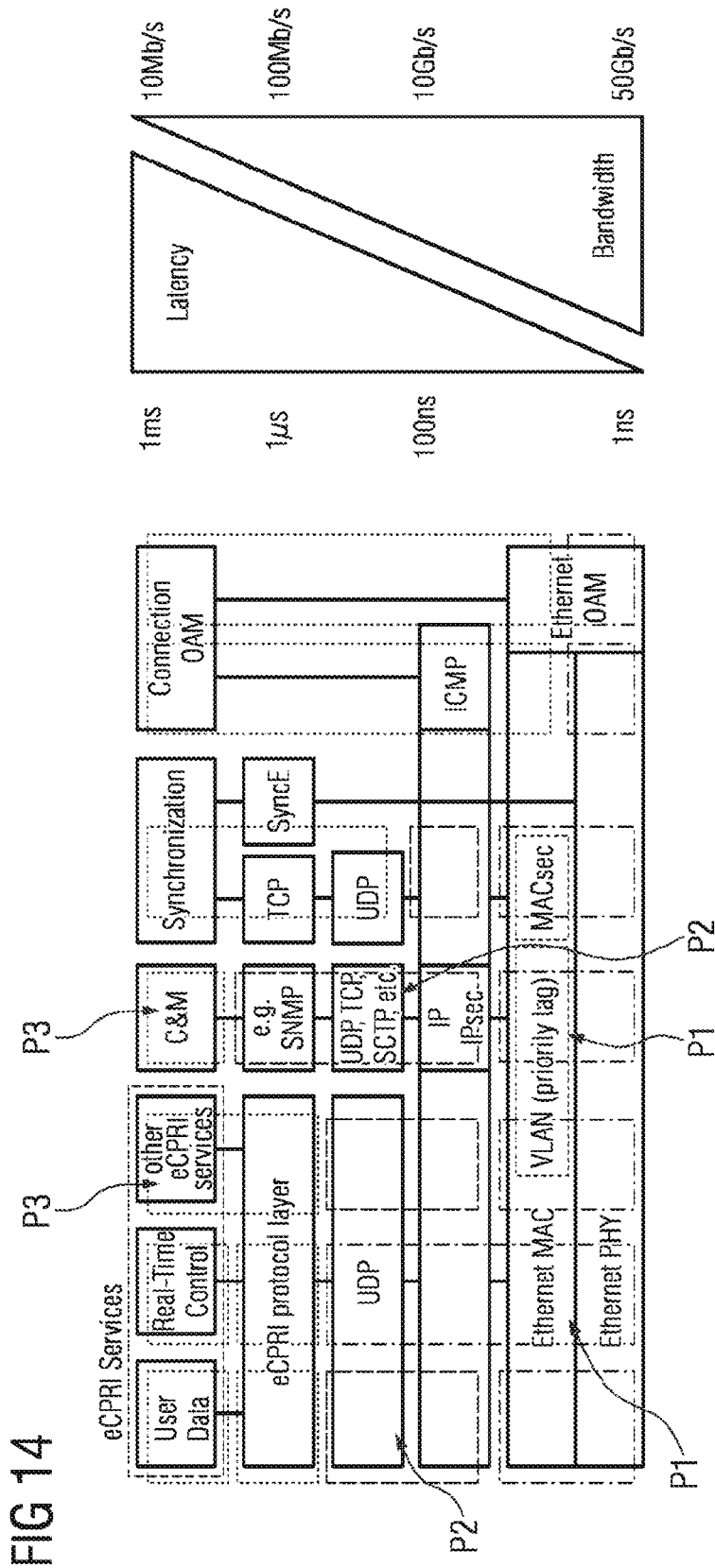
FIG. 14 depicts an example of a protocol stack of the eCPRI protocol.

FIG. 14 shows a protocol stack of the eCPRI protocol. The different protocol layers may require high or low latency, or high or low bandwidth as illustrated on the right hand side of FIG. 14. The higher the protocol layer, the higher the latency may be, and the lesser bandwidth may be needed. The lower the protocol layer, the lower the latency and the higher the bandwidth needs to be. These requirements may be reflected when writing and distributing the instructions for the protocol processing in the main program code. As depicted by the shaded areas in FIG. 14, the protocol processing instructions may be written in program code that may be divided into code segments (with different requirements for processing of the protocol elements) and compiled into target code which then may be distributed onto different processors dependent on the requirement assigned. For example, as shown in FIG. 14, the Ethernet physical layer, PHY, the Ethernet MAC and security functions, as the case may be, may be processed in hardware by a first processor P1, or respective one or more sub-processing modules. The UDP, TCP, SCTP layer may be processed by a second processor or a sub-processing module by hardware or by software, depending on the specific requirements of the implementation. This may be a co-processor of the first processor, a sub-processing module of the first processor, or a separate processor. The eCPRI Services such as User Data, Real-Time Control, and other eCRI Services, as well as the eCPRI protocol layer may be processed by yet another third processor P3. The assignment of latency requirements and/or bandwidth requirements to the code segments of the main program code may depend on the specific application. In one case, the second processor may take care of processing the UDP protocol layer, whereas, in another implementation where a higher bandwidth or lower latency for UDP is necessary, the first processor may serve for processing those protocol layers.

Operations, Administration, and Maintenance, OAM, functionality is critical for operating networks, fault isolation, service, and path awareness. Ethernet also provides a rich set of OAM capabilities for layer 2 packet networking and transport applications. As the case may be, the first processor P1 serves for processing the Ethernet PHY layer whereas, the third processor serves for processing the higher level OAM protocol layer.

The synchronization and C&M (control and management) planes are not covered by the eCPRI protocol and therefore rely on existing methods such as PTP or SyncE. Similarly, the processing of the protocol layers may be distributed between the first second and third processor.

FIG. 15 shows an embodiment of the (eCPRI) protocol processing by different processors P1, P2, e.g., of a test device mimicking a distributed unit DU. Here, a detailed view of processing the different protocol elements is provided. The data packet stream may be received or transmitted based on the processing of the protocol elements of a transport protocol as shown. To that end, a high-speed serial transceiver may be employed. Data packets of the data packet stream may then be switched onto the respective sub-stream SUB1, SUB2, SUB3 or, the other way around, the sub-streams may be combined to form a data packet stream that is transmitted, e.g. to a DUT, in this case a radio unit RU. Now, a first processor P1, here an FPGA, may serve for processing (in hardware) using a first sub-processing module P11 the physical layer, PHY, for each of the data streams in the respective processing paths, which are indicated by the arrows in FIG. 15. In a second sub-processing module P12 the Ethernet MAC (DA) address processing may be performed (in hardware) for one or more of the sub-streams SUB1, SUB2. However, the second sub-processing module P12 may for a third sub-stream SUB3 not perform any processing at all. Multiple first processing modules P11, P12 may be provided, which, for the respective sub-stream, perform processing (in hardware).

For the first sub-stream SUB1, the second processor P2 may process (by software) the Ethernet MAC (SA) address and may also serve to process the antenna data, (e.g., payload data), e.g., for the purpose of analysis as described earlier. In a second sub-stream SUB2, the second processor P2 may, e.g., by a sub-processing module of processor P2, process the synchronization plane data. In the third sub-stream SUB3, the second processor P2 may serve for processing the eCPRI Management Plane and MAC addresses. Thereby, data processing is shared depending on latency requirements between multiple processors P1, P2 and/or their respective sub-processing modules, therein the processing may be done either in hardware by the first processor or in software by the second processor.

The DUT itself may transmit and/or receive the data packet stream. To that end, the DUT may include one or more processors itself, e.g., for sampling and digitizing IQ data. In case of a radio unit the processing of the protocol elements, such as MAC DA and MAC SA, of the transport protocol may be done in hardware completely as shown.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of protocol processing comprising a main program code, the main program code comprising instructions for processing different protocol elements of data packets of a data packet stream of a transport protocol, wherein a data packet of the data packet stream has a header and a payload, wherein the header keeps overhead information about the data packet, a service, and other transmission-related data, and wherein the different protocol elements correspond to the overhead information, wherein the main program code further comprises multiple code segments, the method comprising:
assigning a latency requirement and/or bandwidth requirement to one or more of the multiple code segments of the main program code;
compiling each code segment of the multiple code segments according to the assigned latency and/or the bandwidth requirement into a respective target code for executing each target code of the target codes by a plurality of processors depending on specific requirements set for the multiple code segments of the main program code, wherein processors of the plurality of processors have different processing capabilities, for processing a first type of protocol elements by a first processor of the plurality of processors according to a first target code, and for processing a second type of protocol elements by a second processor of the plurality of processors according to a second target code, wherein the first type of protocol elements and the second type of protocol elements are different; and
distributing the target code to the respective processor for executing the target code.

2. The method of claim 1, further comprising:
dividing the main program code into the multiple code segments.

3. The method of claim 1, further comprising:
processing of a first sub-stream and a second sub-stream of the data packet stream according to the first target code executed by the first processor of the plurality of processors; and
processing the first sub-stream and the second sub-stream according to the second target code executed by the second processor of the plurality of processors; and
processing the first sub-stream and the second sub-stream according to a third target code executed by a third processor of the plurality of processors.

4. The method of claim 1, further comprising:
compiling a first code segment of the main program code by a first compiler;
compiling a second code segment of the main program code by a second compiler; and
compiling a third code segment of the main program code by a third compiler.

5. The method of claim 1, wherein the protocol elements are required to reliably send a payload of data over a transport network, and/or
wherein the protocol elements correspond to elements of an Ethernet frame, and/or
wherein the protocol elements comprise a preamble, a start of frame delimiter, a Media Access Control (MAC) destination address, a MAC source address, a 802.1Q tag, an Ethertype (Ethernet II) or length (IEEE 802.3), a Frame check sequence such as a 32-bit CRC, an interpacket gap, or a combination thereof.

6. The method of claim 1, further comprising:
dividing the data packets of the data packet stream into a first sub-stream and a second sub-stream.

7. The method of claim 6, further comprising:
processing the first sub-stream according to a first processing path,
wherein the first processing path comprises one or more sub-processing modules of the first processor and one or more sub-processing modules of the second processor.

8. The method of claim 7, further comprising:
processing, in the first processing path, a first protocol element of the data packets of the first sub-stream by a sub-processing module of the one or more sub-processing modules of the first processor; and
processing, in the first processing path, a second protocol element of the data packets of the first sub-stream by a sub-processing module of the one or more sub-processing modules of the second processor.

9. The method of claim 8, further comprising:
processing the second sub-stream according to a second processing path,
wherein the second processing path comprises one or more sub-processing modules of the first processor and one or more sub-processing modules of the second processor.

10. The method of claim 9, further comprising:
processing, in the second processing path, a first protocol element of the data packets of the second sub-stream by a first sub-processing module of the one or more sub-processing modules of the first processor; and
processing, in the second processing path, a second protocol element of the data packets of the second sub-stream by a second sub-processing module of the one or more sub-processing modules of the second processor.

11. The method of claim 6, wherein the dividing of the data packets of the data packet stream comprises:
receiving the data packet stream in serial form;
converting the data packet stream in parallel form; and
multiplexing the first sub-stream and the second sub-stream in parallel form onto a first processing path and a second processing path.

12. The method of claim 6, wherein the dividing of the data packets of the data packet stream comprises:
assigning data packets associated with a first antenna carrier to the first sub-stream; and
assigning data packets associated with a second antenna carrier to the second sub-stream.

13. The method of claim 6, further comprising:
processing the first sub-stream and the second sub-stream of the data packet stream by a third processor.

14. The method of claim 1, wherein a first sub-processing module of the first processor performs low-level line coding and real-time functions,
wherein a second sub-processing module of the first processor performs data stream operations,
wherein the second processor performs control functionalities such as timing functionalities and/or payload processing,
wherein the first sub-processing module is a Field Programmable Gate Array (FPGA),
wherein the second sub-processing module is a soft microprocessor, and
wherein the second processor is a Central Processing Unit (CPU).

15. The method of claim 1, wherein sub-processing modules of the first processor, the second processor, and a third processor share a local memory of the first processor, the second processor, and the third processor, and
wherein the first processor, the second processor, and the third processor share a global memory for storing 5G NR symbols.

16. A test device comprising:
at least one processor configured to:
assign a latency requirement and/or bandwidth requirement to one or more code segments of multiple code segments of a main program code, wherein the main program code comprises instructions for processing different protocol elements of data packets of a data packet stream of a transport protocol, wherein a data packet of the data packet stream has a header and a payload, wherein the header keeps overhead information about the data packet, a service, and other transmission-related data, and wherein the different protocol elements correspond to the overhead information;
compile each code segment of the multiple code segments according to the assigned latency and/or the bandwidth requirement into a respective target code for executing each target code of the target codes by a plurality of processors depending on specific requirements set for the multiple code segments of the main program code for processing a first type of protocol elements by a first processor of the plurality of processors according to a first target code and for processing a second type of protocol elements by a second processor of the plurality of processors according to a second target code, wherein the first type of protocol elements and the second type of protocol elements are different, and wherein processors of the plurality of processors have different processing capabilities; and
distribute the target code to a respective processor for executing the target code.

17. A non-transitory computer program comprising instructions that, when executed by a computer, cause the computer to:
assign a latency requirement and/or bandwidth requirement to one or more code segments of multiple code segments of a main program code, wherein the main program code comprises instructions for processing different protocol elements of data packets of a data packet stream of a transport protocol, wherein a data packet of the data packet stream has a header and a payload, wherein the header keeps overhead information about the data packet, a service, and other transmission-related data, and wherein the different protocol elements correspond to the overhead information;
compile each code segment of the multiple code segments according to the assigned latency and/or the bandwidth requirement into a respective target code for executing each target code of the target codes by a plurality of processors depending on specific requirements set for the multiple code segments of the main program code for processing a first type of protocol elements by a first processor of the plurality of processors according to a first target code and for processing a second type of protocol elements by a second processor of the plurality of processors according to a second target code, wherein the first type of protocol elements and the second type of protocol elements are different, and wherein processors of the plurality of processors have different processing capabilities; and
distribute the target code to a respective processor for executing the target code.

* * * * *